United States Patent Office 3,150,135
Patented Sept. 22, 1964

3,150,135
PREPARATION OF OXIMES
Sylvan E. Forman, Lawrence Township, Mercer County, N.J., assignor to FMC Corporation, New York, N.Y., a corporation of Delaware
No Drawing. Filed Nov. 13, 1962, Ser. No. 237,343
17 Claims. (Cl. 260—250)

This application relates to the preparation of oximes, and more particularly, to a novel method for preparing oximes of aromatic aldehydes and ketones which have heretofore been difficult to prepare.

Oximes are a well known class of compounds prepared by reacting an aldehyde or ketone with hydroxylamine in accordance with the equation:

$$RCH= + H_2NOH \rightarrow RCH=NOH + H_2O$$

However, in many cases, it is rather difficult to obtain the aldehyde or ketone starting material for this reaction.

When the aldehyde or ketone precursors of the oxime are not available, in some cases the oxime may be prepared by a nitrosation process involving the reaction of an alkyl nitrite with a compound containing an activated methyl or methylene group in accordance with the equation:

$$RCH_2R' + R''ONO \longrightarrow R\overset{\overset{NOH}{\|}}{C}R' + R''OH$$

This reaction usually requires either an acidic catalyst such as hydrogen chloride, or a basic catalyst such as an alkali metal alkoxide, except in the case of the most highly activated starting materials. Activation of the methyl or methylene group results from the presence of a ketone, aldehyde, ester or nitrile group in the alpha position to the methyl or methylene group. This reaction is fully described by O. Touster in Organic Reactions, edited by R. Adams et al., J. Wiley & Sons, Inc., New York, 1953, vol. VII, pages 327–377.

The oximes derived from certain aromatic compounds, such as picolines, lutidines, alkylbenzoxazoles, alkylbenzothiazoles and alkylpyrazines, are particularly valuable as intermediates for the preparation of medicinal compounds. Since the aldehyde and ketone precursors of these oximes are not readily available, an alternative route to these oximes would be desirable.

When one attempts to convert the above aromatic compounds to the corresponding oximes by the above nitrosation reaction under the usual conditions, the reaction fails, thus indicating that the methyl or methylene group is not sufficiently active. Prior to the present invention, the best known method for preparing these oximes was by converting the above aromatic compounds to the corresponding aldehyde or ketone by an elaborate procedure and then reacting this aldehyde or ketone with hydroxylamine.

It is an object of this invention to provide a method for preparing aromatic oximes by nitrosation, starting with picolines, lutidines, alkylbenzoxazoles, alkylbenzothiazoles, alkylpyrazines, indenes and allylbenzenes without converting these compounds to the corresponding aldehyde or ketone.

This and other objects will become apparent from the following description of this invention.

I have now discovered a method for preparing aromatic oximes of the formulae (1) 

where R is a heterocyclic aromatic ring of the group consisting of pyridine, quinoline, benzoxazole, benzothiazole, pyrazine and lower alkyl substituted derivatives of these heterocyclic aromatic rings and R' is of the group consisting of hydrogen and lower alkyl, (2) 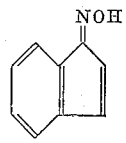

and lower alkyl substituted derivatives thereof, and (3) 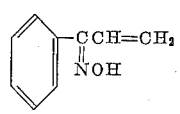

and lower alkyl substituted derivatives thereof, which comprises reacting an aromatic metallo-compound of the group consisting of (1) 

(2) 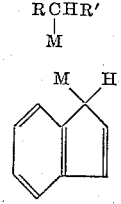

and lower alkyl substituted derivatives thereof, and (3) 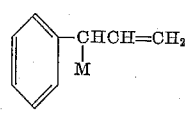

and lower alkyl substituted derivatives, where M is an alkali metal, with an alkyl nitrite to produce an aromatic metal oximate of the group consisting of (1) 

(2) 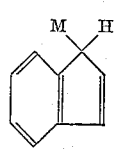

and lower alkyl substituted derivatives thereof, and (3) 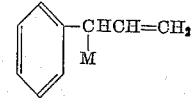

and lower alkyl substituted derivatives thereof, where M is an alkali metal, with an alkyl nitrite to produce an aromatic metal oximate, i.e., a metal salt of an aromatic oxime of the group consisting of (1) 

(2) 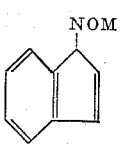

and lower alkyl substituted derivatives thereof, and (3) 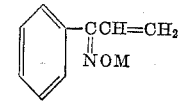

and lower alkyl substituted derivatives thereof. The aromatic metal oximate product is readily converted to the oxime by neutralization.

The metallo-organic compound used as the starting material for the reaction of this invention is readily prepared from an aromatic compound of the group consisting of (1) RCH$_2$R′, where R is a heterocyclic aromatic ring of the group consisting of pyridine, quinoline, benzoxazole, benzothiazole, pyrazine and lower alkyl substiuted derivatives of these heterocyclic aromatic rings and R′ is of the group consisting of hydrogen and lower alkyl, (2) indene and lower alkyl substituted derivatives thereof, and (3) allylbenzene and lower alkyl substituted derivatives thereof. These metallo-organic compounds are most often prepared by reacting the aromatic compound with an alkali metal amide. Thus, by the process of this invention, aromatic oximes are prepared from readily available starting materials without going through the formation of a ketone or aldehyde, or having an activating group present in the starting material of the type heretofore believed necessary.

By the process of this invention, aromatic oximes are prepared from certain aromatic compounds containing a methyl or methylene group which has a hydrogen ionization constant greater than that of ammonia. These compounds include picolines such as

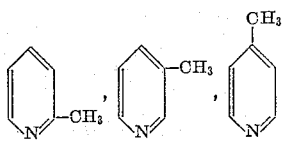

lutidines such as

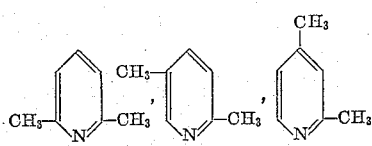

other alkylpyridines such as

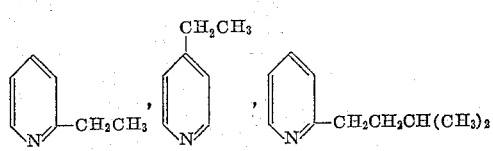

and

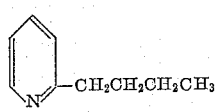

alkylquinolines such as

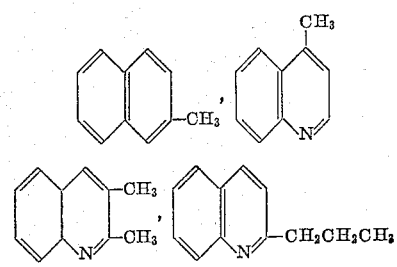

and

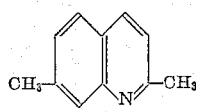

alkylbenzoxazoles such as

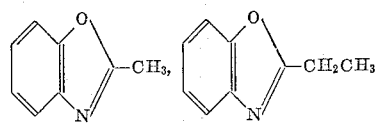

and

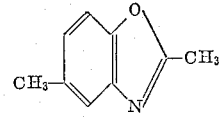

alkylbenzothiazoles such as

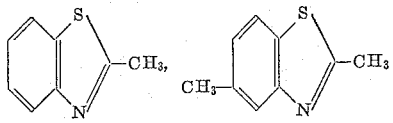

and

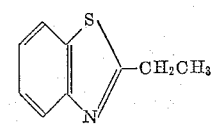

alkylpyrazines such as

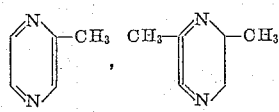

and

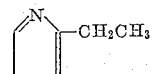

indenes such as

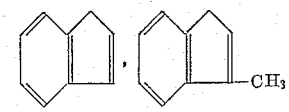

and

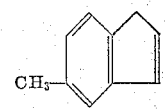

and allylbenzenes such as

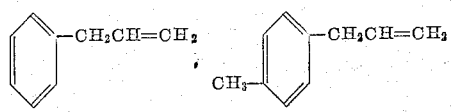

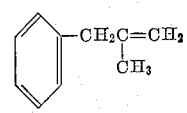

and

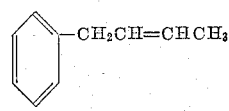

In the case of the compounds containing alkyl groups in both the benzene and the heterocyclic ring of benzoheterocyclic compounds, the metallation and subsequent reaction takes place only on the alpha-carbon of the alkyl groups attached to the heterocyclic ring. Thus, in the case of 2,7-dimethylquinoline, the final product is 7- methyl-2-quinolinealdoxime. When two alkyl groups are in a heterocyclic ring, metallation and subsequent reaction takes place on only one of the alkyl groups, the group containing the most acidic hydrogen. Thus, when starting with 2,5-dimethylpyridine, the product is 5-methyl-2-pyridinealdoxime.

These aromatic compounds are readily converted to the organo-metallic starting materials of this invention by reacting the aromatic compound with an alkali metal amide such as sodium or potassium amide. Alkali metal amides can be obtained commercially or they are readily prepared by reacting the metal with substantially anhydrous ammonia. This reaction is generally catalyzed by small amounts of a ferric salt such as ferric nitrate nonahydrate. Hydrogen is evolved during the formation of the amide. Sodium amide is preferred because it is cheaper, but potassium amide in some cases gives higher yields.

Lithium amide is not as effective in the preparation of the organo-metallic starting materials of this invention. However, aromatic lithium starting materials can be prepared by reacting an organic lithium, such as phenyl lithium, with the aromatic compound. This aromatic lithium starting material is somewhat less effective in the process of this invention than the aromatic metallo-compounds derived from sodium and potassium amide. The preparation of metallo-compounds from substituted pyridines is fully described by H. L. Yale in The Chemistry of Heterocyclic Compounds, edited by A. Weissberger, Interscience Publishers, Inc., New York, 1961, volume entitled Pyridine and Its Derivatives, edited by E. Klingsberg, Part 2, pages 421–468.

It is preferred that the metallo-compound be prepared in the presence of an excess of liquid ammonia as solvent for the reaction. The reason for this preference is that ammonia has been found to be an exceptionally good solvent for the oximination step of this invention. Accordingly, it is convenient to use this same solvent in the preparation of the metallo-compound, since the product of this reaction can be used directly in the oximination step without recovery of the metallo-compound. For best results about 200–500 mls. of liquid ammonia are used per mole of aromatic compund.

Using 2-picoline as an example of the aromatic compound, the formation of the aromatic metallo-compound starting material of this invention with an alkali metal amide takes place as follows:

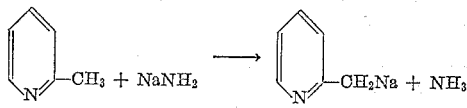

When liquid ammonia is used as the solvent, the reaction is conveniently carried out at atmospheric pressure at the reflux temperature of ammonia, which is about −33° C. The reaction can proceed with as little as about 0.5 mole of aromatic compound per mole of alkali metal amide, but excess of aromatic compound is preferred. Generally about 0.5–3.0 moles of aromatic compound may be used per mole of alkali metal amide, and preferably about 1–2 moles. Excess aromatic compound can be recovered at the end of the process.

Again using 2-picoline as an example, preparation of the aromatic lithium compound from phenyl lithium is illustrated by the following reaction:

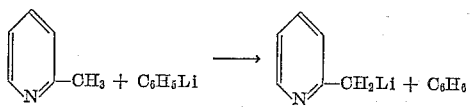

This reaction is convenient carried out in the presence of ethyl ether as a solvent. The presence of ether does not interfere with the subsequent oximination step.

The aromatic metallo-compound is converted in accordance with this invention to the aromatic metal oximate by reaction with an alkyl nitrite in accordance with the following equations:

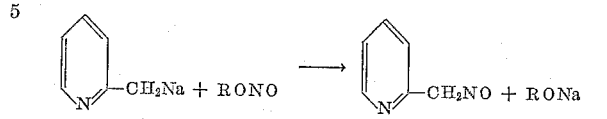

The nitroso intermediate is immediately converted to the alkali metal oximate by reaction with the highly alkaline aromatic metallo-compound:

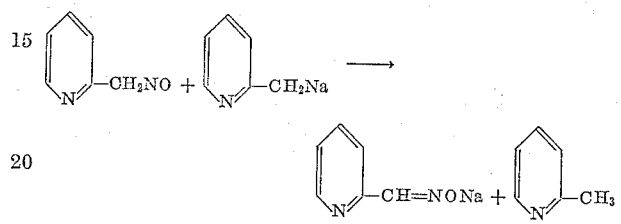

Accordingly, the overall reaction for the oximination of this invention is represented by the equation:

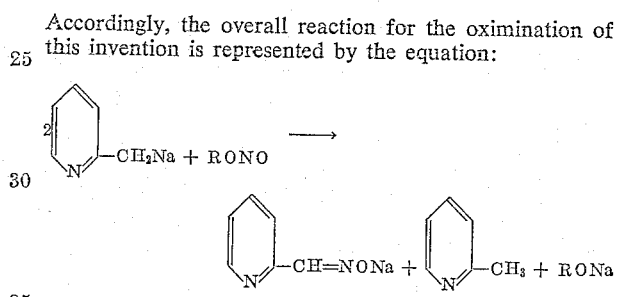

Thus, in theory, two moles of the aromatic metallo-compound react with one mole of alkyl nitrite to form one mole of metal oximate, one mole of the original aromatic compound and one mole of alkali metal alkoxide.

When the aromatic compound is a stronger acid than an alcohol, as is the case with indene, one mole of alkyl nitrite reacts with each mole of aromatic metallo-compound in accordance with the equation:

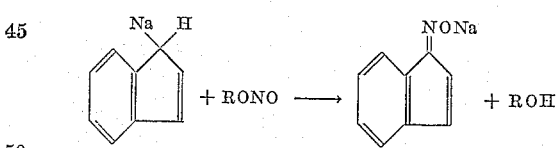

This is a more favorable reaction since it requires only one mole of metallo-compound to produce each mole of metal oximate and does not result in the formation of aromatic compound which must be recycled.

The amount of alkyl nitrite may be varied from the theoretical amount, but there is no special advantage to be gained thereby. Generally, about 1–3 moles of metallo-compound is reacted with each mole of alkyl nitrite, and preferably about the theoretical amount is used. In the case of indene, generally about 0.5–1.5 mole of metallo-indene is reacted with each mole of alkyl nitrite. It is preferred that an excess of alkyl nitrite be avoided since this tends to reduce the yield. If less than the theoretical amount of aromatic metallo-compound is formed during the metallation step, it is advisable to reduce the amount of alkyl nitrite to correspond to the actual amount of metallo-compound formed.

This oximination reaction is preferably carried out in the presence of a primary alkyl nitrite. The particular alkyl group used will generally be determined by cost and whether the alcohol derived from the alkali metal alkoxide is to be recovered. For best results, lower primary alkyl nitrites are used. Secondary nitrites could be used but they would be less stable. Suitable alkyl groups include methyl, ethyl, propyl, isopropyl, butyl, isobutyl, sec.-butyl, amyl, isoamyl, hexyl, heptyl, octyl, 2-ethyl hexyl, nonyl, decyl, dodecyl and stearyl.

For convenience, it is preferred that the nitrite be added in ether solution thus allowing a slow addition of the nitrite to the reaction mixture containing the metallo-compound. The reaction of the nitrite with the metallo-compound is quite rapid and the use of a solvent allows better control of the reaction. In place of ether, other solvents which are free of acidic hydrogens, including such weakly acidic hydrogens as are present in alcohols and ketones, and which have suitable freezing and boiling characteristics, as well as being a solvent for the alkyl nitrite, could be used.

The oximination is preferably carried out in the presence of anhydrous liquid ammonia as the solvent medium. Although other solvents such as tetrahydrofuran can be used, the results obtained in liquid ammonia are markedly superior. A considerable quantity of ethyl ether can be tolerated in the reaction mixture without interfering with the favorable results obtained in the presence of ammonia.

The oximination reaction of this invention may be carried out over a wide choice of temperatures and pressures. In general, the temperature may be varied from about $-75°$ C. to about $100°$ C. The reaction is quite rapid and readily takes place at very low temperatures. When refluxing ammonia is used as the solvent at atmospheric pressure, the temperature of the reaction medium will be about $-33°$ C. A somewhat higher refluxing temperature can be used by elevating the pressure on the system. When using solvents other than ammonia, there is no advantage in using temperatures above about $100°$ C. since the reaction is sufficiently rapid at lower temperatures.

It is preferred that water be excluded from the reaction mixture until after reaction with the alkyl nitrite has taken place. The alkali amides and the aromatic metallo-compounds react with water, to the extent of the water present, thus decomposing valuable reagents. Metalloindenes appear to be stable to water.

The neutralization or decomposition of the alkali metal salt of the oxime to the corresponding free oxime is carried out by reacting the oxime salt with an acid or an ammonium salt. When the oximination reaction is carried out in the presence of liquid ammonia as the solvent, it is preferred to use ammonium salts of strong acids, such as ammonium sulfate, to neutralize the metallic oximate. Such ammonium salts are acids in the ammonia system and efficiently neutralize all of the highly alkaline compounds present including the alkali metal alkoxide and any alkali metal amide or aromatic metallo-compound present. The use of stronger acids such as mineral acids would be equally effective, but since the heat of neutralization is greater, an unnecessary heat load would result. The neutralizing agent is preferably added as an aqueous solution.

Using ammonium sulfate as an example, the neutralization reaction takes place as follows:

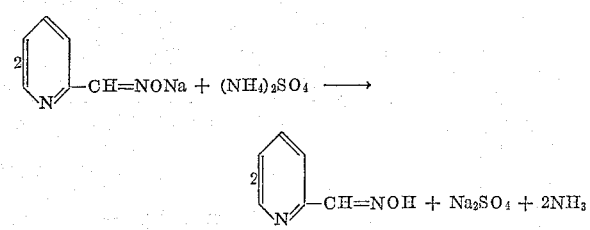

The ammonium salt or acid neutralizing agent will also react with the alkali metal alkoxide formed during the oximination reaction to form the corresponding alcohol and a salt in accordance with the equation:

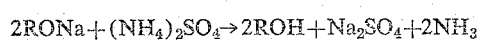

At least an equivalent of neutralizing agent should be used for each equivalent of oxime salt and alkali metal alkoxide, and preferably an excess is employed. The ammonium salt or acid neutralizing agent is conveniently added as an aqueous solution, and sufficient water may be used to dissolve the alkali metal salt resulting from the neutralization reaction. It is advantageous to add the neutralizing agent as rapidly as possible since the time required for it to react is very short. Another method of neutralizing the oxime salt is by the use of an acidic ion exchange resin.

The oxime is readily recovered from the aqueous solution resulting from the neutralization step by extraction with an organic solvent. Ethyl ether is a preferred solvent, although other ethers or cyclic ethers such as tetrahydrofuran, as well as many other solvents which will dissolve the product, can be used.

After the extraction solvent has been added, two or three phases are formed. If undissolved mineral salts are present as a solid phase, the liquid phases can be separated from the solids by decantation or any other suitable means. Two liquid phases will be present; an aqueous phase and the extract phase. The aqueous phase will contain the alkali metal salt, excess neutralizing agent and some ammonia. The extract phase will contain the oxime product, unreacted aromatic compound, alkyl alcohol, tars and some ammonia.

Although the oxime product contained in the extract phase can be isolated by crystallization from the organic solvent, I have found that the most expedient manner of recovering the oxime is by vaporization under reduced pressure. The oximes derived from the reaction of this invention are high melting solids which can be distilled without decomposition. If the distillation is carried out under high vacuum, these oximes will sublime at temperatures below their melting points and thus can be recovered as solid condensates without exposing them to very high temperatures.

The oximes which are derived from the reaction of this invention are susceptible to a number of uses. They are useful as pharmaceuticals and as chemical intermediates for the synthesis of pharmaceuticals such as drugs for treating tuberculosis, and malaria. The quaternary ammonium halide salts of these oximes are known to be antidotes for nerve gases. These oximes are also useful as metal chelating agents which are useful for analytical purposes, purification techniques, and electrolytic plating. These oximes can also be hydrolyzed to the corresponding aldehydes or ketones, reduced to amines, hydrated to nitriles, rearranged to amides and reacted in numerous other ways to form useful compounds which would be difficult to obtain by other means.

The following examples, illustrating the novel method of making aromatic metal oximates disclosed herein, are present without any intention that the invention be limited thereto. All parts and percentages are by weight.

EXAMPLE 1

Fifty milliliters of anhydrous liquid ammonia was collected in a reaction flask equipped with a stirrer and a reflux condenser cooled by Dry Ice. About 0.1 g.

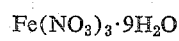

was added as a catalyst to convert the sodium metal to sodamide. Two and three-tenths grams (0.010 mole) of sodium metal was added in small pieces while maintaining the reaction at the reflux temperature of liquid ammonia. The sodium metal dissolved and formed a blue solution. After about 20 min., the blue color disappeared when the sodium metal had reacted to form sodamide. The white, insoluble sodamide was colored dark gray by finely divided iron or a compound of iron resulting from the catalyst. Nine and three-tenths grams (0.10 mole) of 4-picoline was added and the mixture turned deep red. The 4-picoline was allowed to react for 1 hr., after which the formation of picolyl sodium was complete.

A solution of 10.3 g. (0.10 mole) of butyl nitrite in 10 mls. of ethyl ether was added slowly to the picolyl sodium product prepared above while maintaining the temperature by refluxing ammonia. The color became less intense and turned yellow in local areas and solids formed. The reaction was exothermic and appeared to be instantaneous, but a half hour was allowed to be sure that the reaction to form the sodium salt of 4-pyridine-aldoxime was complete.

A solution of 10 g. (0.076 mole) of ammonium sulfate in 15 mls. of water was added to the product of the above reaction as rapidly as boiling of the ammonia would permit. The ammonia was allowed to evaporate, and as space became available in the reaction flask, 25 mls. of ethyl ether was added. When the reaction mixture reached about 25° C., the liquids were decanted from the solids, which were largely sodium sulfate or its hydrate. The solids were filtered with suction, washed with a little water, then with ethyl ether and finally discarded. The combined water layers were extracted with ethyl ether and then discarded.

The combined ethyl ether layers were distilled from a steam bath at atmospheric pressure until the ammonia and most of the ether had distilled. After the residue had been heated at 100° C. at 20 mm., it weighed 2.0 g. The residue was distilled or sublimed by heating with a wax bath at a pressure below 1 mm. The solid condensate weighed 1.8 g. (0.015 mole) for 29% yield, M.P. 118–132° C., and was nearly pure 4-pyridinealdoxime as indicated by its infrared spectrum. The percentage yield was calculated according to the equation which requires two moles of sodium for each mole of product. One crystallization from benzene gave 1.5 g. of pure product, M.P. 132–133.5° C., which gave the correct elemental analysis for carbon, hydrogen and nitrogen.

Table I lists this example and examples of other oximes prepared by this method.

*Table 1*

OXIMES PREPARED BY A METHOD SIMILAR TO EXAMPLE 1

| Ex. | Reactant | Product | Sublimed yield Percent | Sublimed yield M.P., ° C. | Melting point purified, ° C. |
|---|---|---|---|---|---|
| 1 | 4-picoline | 4-pyridinealdoxime | 29 | 118–132 | 132–133.5 |
| 2[1] | 4-picoline | 4-pyridinealdoxime | 30 | 115–134 | 130–133 |
| 3 | 3-picoline | 3-pyridinealdoxime | 1.5 | 80–145 | ---------- |
| 4 | 2,6-lutidine | 6-methyl-2-pyridinealdoxime | 50 | ---------- | 165–168 |
| 5 | 2,4-lutidine | 2-methyl-4-pyridinealdoxime | 41 | 105–155 | 157–159.5 |
| 6[1] | 2,4-lutidine | 2-methyl-4-pyridinealdoxime | 83.5 | ---------- | ---------- |
| 7 | 4-ethyl-pyridine | methyl-4-pyridylketone | 44 | 110–155 | 147–161 |
| 8 | Quinaldine | 2-quinolinealdoxime | 28 | 180–185 | 187–190 |
| 9 | 2-methylbenzoxazole | 2-benzoxazolealdoxime | 55 | 100–150 | 168–170 |
| 10 | 2-methylbenzothiazole | 2-benzothiazolealdoxime | 39 | 120–178 | 192–196 / 167–173 |
| 11 | 2-methylpyrazine | 2-pyrzinealdoxime | 39 | 88–96 | 90–97 |

See footnotes at end of table.

Table—Continued
OXIMES PREPARED BY A METHOD SIMILAR TO EXAMPLE 1

| Ex. | Reactant | Product | Sublimed yield Percent | Sublimed yield M.P., °C. | Melting point purified, °C. |
|---|---|---|---|---|---|
| 12 [2] | Indene | 1-oximinoindene | 76 | 74–100 | 109–112 |
| 13 | Allybenzene (—CH₂CH₂=CH₂) | Phenyl vinyl ketoxime (—C—CH=CH₂, ‖NOH) | 19 | Syrup [3] and crystals | |

[1] Only half as much butyl nitrite used.
[2] Yield based on the requirement of 1 mole of sodium per mole of product.
[3] Syrup and crystals.

Since 1 mole of butyl nitrite was used for each mole of metallo-compound in Examples 1, 3–5, 7–11 and 13, a 100% excess of the theoretical amount of butyl nitrite was present. This excess was detrimental to the yields. In Example 12, 1 mole of butyl nitrite per mole of metallo-indene was the theoretical amount.

EXAMPLE 14

2-picoline was oximinated as described in Example 1, except that methyl nitrite replaced the butyl nitrite. A 34% yield of sublimed 2-pyridinealdoxime was obtained having, after one crystallization from benzene, a melting point of 109–112° C.

EXAMPLE 15

2-picoline was oximinated according to Example 1 except that 2-ethylhexyl nitrite was used instead of butyl nitrite. The sublimed yield of 2-pyridinealdoxime was 49% and after one crystallization from benzene it melted at 111–113.5° C.

EXAMPLE 16

This example represents the preferred method for preparing 2-pyridinealdoxime: To 400 mls. of refluxing anhydrous liquid ammonia containing about 0.5 g. of ferric nitrate nonahydrate was added 2.0 moles of sodium in small pieces. After the sodium had dissolved and the blue color had vanished, 3.0 moles of 2-picoline was added during 0.5 hr. After waiting for 1 hr., a solution of 1.0 mole of butyl nitrite in 110 mls. of ethyl ether was added during the next ¾ hr. One hour later, a solution of 1.5 moles of ammonium sulfate in 300 mls. of water was added. The ammonia was allowed to evaporate while 500 mls. of ethyl ether was added. When the temperature of the reaction mixture had risen to about 25° C., the liquids were decanted and filtered from the solids which were washed with ethyl ether. The ether layer was separated from the aqueous layer which was extracted with additional ether. The combined ether layers were distilled to remove solvent and the residue was distilled at a pressure below 1 mm. The distillate consisted of 91.5 g. of solid product for a yield of 75%.

Table II presents Example 16 and other examples of the preparation of 2-pyridinealdoxime by procedures similar to Example 16, except that the proportions of reagents were varied. In each case, the moles of 1-picoline indicated were reacted with 2.0 moles of sodium in liquid anhydrous ammonia. Accordingly, in theory, 2 moles of 2-picolyl sodium were present in each example.

Table II

| Example | Milliliters, NH₃ | Moles, 2-picoline | Moles, BuONO | Yield, percent |
|---|---|---|---|---|
| 16 | 400 | 3.0 | 1.0 | 75 |
| 17 | 1,500 | 2.0 | 1.0 | 56 |
| 18 | 1,000 | 2.0 | 1.0 | 61 |
| 19 | 1,000 | 2.0 | 1.2 | 53 |
| 20 | 1,000 | 3.0 | 1.0 | 68 |
| 21 | 670 | 2.0 | 1.0 | 66 |
| 22 | 535 | 2.0 | 1.0 | 64 |
| 23 | 535 | 3.0 | 1.0 | 74 |
| 24 [1] | 470 | 3.0 | 1.0 | 71 |
| 25 | 400 | 4.0 | 1.0 | 74 |
| 26 | 270 | 3.0 | 1.0 | 47 |

[1] BuONO diluted with 500 mls. of ethyl ether.

A comparison of Examples 17, 18, 21 and 22 shows that a more concentrated reaction mixture gives better yields. A comparison of Examples 18 and 19 shows that the use of excess butyl nitrite is a disadvantage. A comparison of Examples 18 and 20 or of Examples 22 and 23 shows that 50% excess 2-picoline is advantageous but Example 25 shows that no further advantage results from 100% excess 2-picoline. Examples 16 and 23 appear to be near the optimum proportions of reagents and indicate that 400 to 535 mls. of liquid ammonia is in the best range. Further reduction in the amount of ammonia, as in Example 26, reduced the yield. Use of a larger amount of ethyl ether as diluent as in Example 24 is not advantageous.

EXAMPLE 27

This example illustrates the use of potassium amide instead of sodamide:

2-picoline was oximinated by a procedure similar to Example 19 except that half as much reagents were used and 39.1 g. (1 mole) of potassium was used instead of sodium. The sublimed yield of 2-pyridinealdoxime was 70% of theoretical.

EXAMPLE 28

This example illustrates the use of lithium to produce the aromatic metallo-compound which is converted to an oxime.

To 130 mls. of ethyl ether was added 1.4 g. (0.20 mole) of lithium metal. A 2 ml. portion of 15.7 g. (0.10 mole) of bromobenzene was added to the refluxing mixture and after the reaction started, the rest of the bromobenzene was added slowly. The mixture was refluxed for 1.5 hrs. after the addition to complete the formation of phenyl lithium. The mixture was cooled to −10° C., 0.10 mole of 2-picoline was added and after waiting ¾ hr., 150 mls. of anhydrous liquid ammonia was added. A solution of 0.10 mole of butyl nitrite in 11 ml. of ethyl ether was added slowly. After 1.25 hrs., a solution of 0.076 mole of ammonium sulfate in 15 mls. of water was added, and the ammonia was allowed to evaporate. The ether layer was separated from the solids and aqueous layer which were extracted with additional ethyl ether. The combined ether layers were stripped of solvent finally at 60° C. and 2 mm. The less volatile residue, 1.3 g., was distilled in vacuum at 7.5 mm. The small amount of partly crystalline condensate had all of the characteristic infrared bands of 2-pyridinealdoxime.

EXAMPLE 29

This example illustrates the use of tetrahydrofuran rather than liquid ammonia as the solvent for the oximination.

Potassium, 0.10 mole, was added to 50 mls. of anhydrous liquid ammonia containing a small amount of ferric nitrate nonahydrate. After the blue color had disappeared, 0.10 mole of 2-picoline was added and then 50 mls. of tetrahydrofuran. When most of the ammonia had evaporated, the mixture was heated under reflux for 1 hr. with a water cooled condenser to complete the removal of ammonia. The mixture was cooled to room temperature and 0.10 mole of butyl nitrite was added slowly. The mixture was allowed to stand overnight and then it was refluxed for ½ hr. The mixture was cooled to room temperature, a solution of 0.076 mole of ammonium sulfate in 15 mls. of water was added slowly and then the mixture was heated under reflux for a short time. The liquid portion was decanted from the solids. The solvent was evaporated from the liquid portion up to a temperature of 100° C. at 3 mm., and 4.3 g. of residue was left. The residue was dissolved in 25 mls. of 2 N NaOH, the solution was extracted with ethyl ether, and the ether extract was discarded. The alkaline solution was made acid with 50 mls. of 2 N HCl, the resulting acid solution was extracted with ethyl ether, and the ether extract was discarded. The aqueous solution was neutralized with 25 mls. of 2 N NaOH, buffered with 25 ml. of 2 molar ammonium acetate and extracted with ethyl ether. The ether solution containing the desired product was evaporated and left 1.8 g. of residue.

A 30 x 1 cm. column was packed with the strong acid ion exchange resin Amberlite I.R.-120 and the column of resin was filled with water. The residue from the ether evaporation was dissolved in 5 mls. of 1 N HCl and applied to the top of the column. The sample was eluted with 1 N HCl and fractions of elutant were collected. Each fraction was neutralized with dilute ammonia solution, treated with a little sodium acetate and extracted with ethyl acetate. Evaporation of the solvent left crystalline residues totaling 0.4 g. The infrared spectrum of the largest fraction corresponded with that of 2-pyridinealdoxime and melted 75–110° C. Another fraction had M.P. 111.5–112° C.

As will be apparent to those skilled in the art, numerous modifications and variations of the embodiments illustrated above may be made without departing from the spirit of the invention or the scope of the following claims.

I claim:

1. A method of making an aromatic metal oximate of the group consisting of (1) 

where R is a heterocyclic aromatic ring of the group consisting of pyridine, quinoline, benzoxazole, benzothiazole, pyrazine, and lower alkyl substituted derivatives of these heterocyclic aromatic rings, and R' is of the group consisting of hydrogen and lower alkyl, (2) 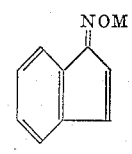

and lower alkyl substituted derivatives thereof, and (3) 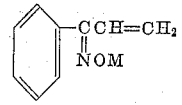

and lower alkyl substituted derivatives thereof, where M is an alkali metal, which comprises reacting an aromatic metallo-compound of the group consisting of (1) 

(2) 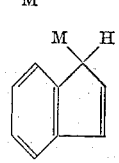

and lower alkyl substituted derivatives thereof, and (3) 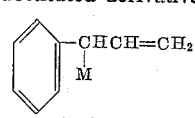

and lower alkyl substituted derivatives thereof with an alkyl nitrite to produce said aromatic metal oximate.

2. The method of claim 1 in which 1–3 moles of aromatic metallo-compound is reacted with each mole of alkyl nitrite.

3. The method of claim 1 in which the alkyl nitrite is a lower primary alkyl nitrite.

4. The method of claim 1 in which the reaction is carried out at a temperature of −75 to 100° C.

5. The method of claim 1 in which the reaction is carried out in the presence of refluxing substantially anhydrous ammonia.

6. A method of making a heterocyclic aromatic metal oximate of the formula

where R is a heterocyclic aromatic ring of the group consisting of pyridine, quinoline, benzoxazole, benzothiazole, pyrazine and lower alkyl substituted derivatives of these heterocyclic aromatic rings, R' is of the group consisting of hydrogen and lower alkyl and M is an alkali metal, which comprises reacting 1–3 moles of a heterocyclic aromatic metallo-compound of the formula

with one mole of a lower primary alkyl nitrite at a temperature of −75 to 100° C. to produce said heterocyclic aromatic metal oximate, a heterocyclic aromatic compound of the formula RCH$_2$R' and an alkali metal lower primary alkoxide.

7. The method of claim 6 in which the reaction is carried out in the presence of refluxing substantially anhydrous ammonia.

8. The method of claim 6 in which the heterocyclic aromatic metallo-compound is 4-ethylpyridyl sodium.

9. A method of making a heterocyclic aromatic sodium aldoximate of the formula

where R is a heterocyclic aromatic ring of the group consisting of pyridine, quinoline, benzoxazole, benzothiazole, pyrazine and lower alkyl substituted derivatives of these heterocyclic aromatic rings, which comprises reacting 2 moles of a heterocyclic aromatic sodio-compound of the formula RCH₂Na with one mole of a lower primary alkyl nitrite in the presence of refluxing substantially anhydrous ammonia to produce one mole of said heterocyclic aromatic sodium aldoximate, one mole of a heterocyclic aromatic compound of the formula RCH₃, and one mole of a sodium lower primary alkoxide.

10. The method of claim 9 in which the heterocyclic aromatic sodio-compound is 2-picolyl sodium.

11. The method of claim 9 in which the heterocyclic aromatic sodio-compound is 4-picolyl sodium.

12. The method of claim 9 in which the heterocyclic aromatic sodio-compound is 2,6-lutidyl sodium.

13. The method of claim 9 in which the heterocyclic aromatic compound is 2-methylpyrazyl sodium.

14. A method of making an aromatic oxime of the group consisting of (1) 

where R is a heterocyclic aromatic ring of the group consisting of pyridine, quinoline, benzoxazole, benzothiazole, pyrazine, and lower alkyl substituted derivatives of these heterocyclic rings, and R' is of the group consisting of hydrogen and lower alkyl (2) 

and lower alkyl substituted derivatives thereof, and (3) 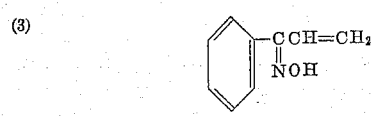

and lower alkyl substituted derivatives thereof which comprises reacting an aromatic compound of the group consisting of (1) RCH₂R', (2) indene and lower alkyl substituted derivatives thereof, and (3) allylbenzene and lower alkyl substituted derivatives thereof with an alkali metal amide of the group consisting of sodamide and potassium amide, reacting the resulting aromatic metallo-compound of the group consisting of (1) RCHR'
     |
     M (2) 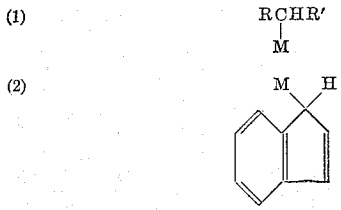

and lower alkyl substituted derivatives thereof, and (3) 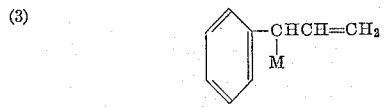

and lower alkyl substituted derivatives thereof, where M is an alkali metal of the group consisting of sodium and potassium, with an alkyl nitrite, and neutralizing the resulting aromatic metal oximate of the group consisting of (1) 

(2) 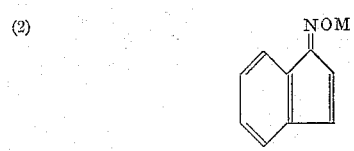

and lower alkyl substituted derivatives thereof, and (3) 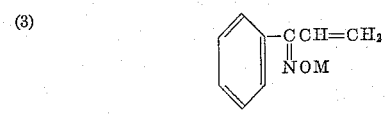

and lower alkyl substituted derivatives thereof to produce said aromatic oxime.

15. The method of claim 14 in which the aromatic compound is RCH₂R'.

16. The method of claim 14 in which the aromatic compound is RCH₃.

17. The method of claim 14 in which the aromatic compound is 2-picoline.

No references cited.

UNITED STATES PATENT OFFICE
CERTIFICATE OF CORRECTION

Patent No. 3,150,135                              September 22, 1964

Sylvan E. Forman

It is hereby certified that error appears in the above numbered patent requiring correction and that the said Letters Patent should read as corrected below.

Column 1, line 17, the equation should appear as shown below instead of as in the patent:

column 2, line 35, after "derivatives" insert -- thereof --; line 37, beginning with "of the group consisting of" strike out all to and including "matic metal oximate" in line 56, same column 2; column 3, lines 58 to 63, the formulas should appear as shown below instead of as in the patent:

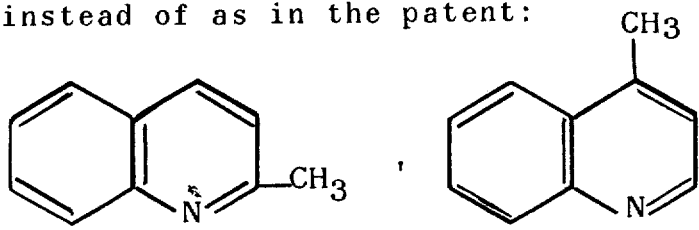

column 4, lines 29 to 33, the formulas should appear as shown below instead of as in the patent:

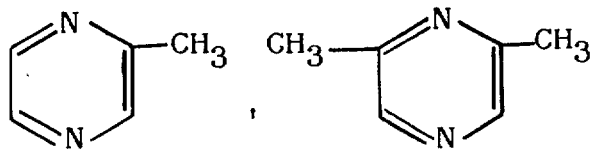

column 5, line 43, for "compund" read -- compound --; line 73, for "convenient" read -- conveniently --; column 8, line 62, after "0.1 g." insert -- of --; line 66, for "(0.010 mole)" read -- (0.10 mole) --; columns 9 and 10, Table I, under the heading "Product" and opposite "Ex. 7", for "methyl-4-pyridylketone" read -- methyl-4-pyridylketoxime --; same Table I, under the heading "Product" and opposite "Ex. 11," for "2-pyrzinealdoxime" read -- 2-pyrazinealdoxime --; columns 11 and 12, in Table-Continued, under the heading "Reactant" and opposite "Ex. 13," for "Allybenzene" read -- Allylbenzene --; column 11, line 72, for "1-picoline" read -- 2-picoline --.

Signed and sealed this 16th day of March 1965.

(SEAL)
Attest:

ERNEST W. SWIDER
Attesting Officer

EDWARD J. BRENNER
Commissioner of Patents